US012747337B2

(12) United States Patent
Suzuki et al.

(10) Patent No.: US 12,747,337 B2
(45) Date of Patent: Sep. 29, 2026

(54) COMPOSITION AND MULTILAYER BODY

(71) Applicant: DAIKIN INDUSTRIES, LTD., Osaka (JP)

(72) Inventors: Yuuki Suzuki, Osaka (JP); Toshiharu Shimooka, Osaka (JP); Yoshiko Kuwajima, Osaka (JP); Tomoya Hidaka, Osaka (JP); Shigeaki Yamazaki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 833 days.

(21) Appl. No.: 17/269,599

(22) PCT Filed: Jul. 16, 2019

(86) PCT No.: PCT/JP2019/027852

§ 371 (c)(1),
(2) Date: Feb. 19, 2021

(87) PCT Pub. No.: WO2020/054210

PCT Pub. Date: Mar. 19, 2020

(65) Prior Publication Data

US 2021/0198453 A1 Jul. 1, 2021

(30) Foreign Application Priority Data

Sep. 14, 2018 (JP) ................................ 2018-172490

(51) Int. Cl.

| | |
|---|---|
| ***C08K 7/06*** | (2006.01) |
| ***C08K 3/04*** | (2006.01) |
| ***C09D 139/06*** | (2006.01) |
| ***H01M 4/62*** | (2006.01) |

(52) U.S. Cl.

CPC ................ *C08K 7/06* (2013.01); *C08K 3/041* (2017.05); *C09D 139/06* (2013.01); *H01M 4/623* (2013.01); *H01M 4/625* (2013.01); *C08K 2201/011* (2013.01)

(58) Field of Classification Search

CPC ...... H01M 4/623; H01M 4/625; C09D 139/06
See application file for complete search history.

(56) References Cited

U.S. PATENT DOCUMENTS

| | | | | |
|---|---|---|---|---|
| 2005/0233221 | A1 | 10/2005 | Araki et al. | |
| 2007/0224106 | A1 | 9/2007 | Sakakibara et al. | |
| 2014/0332731 | A1 | 11/2014 | Ma et al. | |
| 2015/0017532 | A1* | 1/2015 | Iguchi .................. | H01M 4/623 252/182.1 |
| 2018/0022846 | A1 | 1/2018 | Kanbara et al. | |

FOREIGN PATENT DOCUMENTS

| | | | |
|---|---|---|---|
| JP | 61-284761 | A | 12/1986 |
| JP | 2004-349240 | A | 12/2004 |
| JP | 2005-162877 | A | 6/2005 |
| JP | 2011068709 | A * | 4/2011 |
| JP | 2016-025077 | A | 2/2016 |
| JP | 2016166288 | A * | 9/2016 |
| JP | 2017-054649 | A | 3/2017 |
| WO | 2016/017759 | A1 | 2/2016 |
| WO | 2016/133206 | A1 | 8/2016 |
| WO | 2016/204142 | A1 | 12/2016 |
| WO | 2016/204217 | A1 | 12/2016 |

OTHER PUBLICATIONS

Machine translation of WO2016017759 (Year: 2016).*
Machine translation of JP-2016166288-A (Year: 2016).*
Machine translation of JP-2011068709-A (Year: 2011).*
International Search Report of PCT/JP2019/027852 dated Oct. 15, 2019 [PCT/ISA/210].
International Preliminary Report on Patentability issued Mar. 9, 2021 with translation of the Written Opinion in International Application No. PCT/JP2019/027852.
Extended European Search Report issued May 19, 2022 in counterpart European Application No. 19858815.4.

* cited by examiner

*Primary Examiner* — Wenwen Cai
(74) *Attorney, Agent, or Firm* — Sughrue Mion, PLLC

(57) ABSTRACT

A composition including an inorganic filler; a copolymer of a fluoromonomer and an amide bond-containing polymerizable vinyl compound; and a solvent. Also disclosed is a laminate including a substrate and a film on the substrate obtained from the composition and a dispersant including a copolymer of a fluoromonomer and an amide bond-containing polymerizable vinyl compound.

9 Claims, No Drawings

COMPOSITION AND MULTILAYER BODY

CROSS REFERENCE TO RELATED APPLICATIONS

This application is a National Stage of International Application No. PCT/JP2019/027852, filed Jul. 16, 2019, claiming priority to Japanese Patent Application No. 2018-172490, filed Sep. 14, 2018.

TECHNICAL FIELD

The disclosure relates to compositions and laminates.

BACKGROUND ART

In the fields where inorganic filler is used, such as the fields of ink, rubber, conductive films, and electrochemical devices (e.g., batteries), dispersants are generally used for uniformly dispersing inorganic filler in dispersion media.

For example, in the field of secondary batteries such as lithium-ion batteries, polyvinylpyrrolidone (PVP) has been widely used as a dispersant for dispersing carbon filler (e.g., acetylene black, oil furnace black, carbon nanotube, and graphene) that is used as a positive electrode conductive aid (e.g., see Patent Literature documents 1 to 3).

Proposed in fields other than the field of dispersants is to use a copolymer of tetrafluoroethylene and N-vinylpyrrolidone as, for example, a hydrophilizing agent, a material for preventing adhesion of aquatic organisms, or a biocompatible material (e.g., Patent Literature documents 4 to 6).

CITATION LIST

Patent Literature
Patent Literature 1: JP 2005-162877 A
Patent Literature 2: JP 2017-54649 A
Patent Literature 3: JP 2016-25077 A
Patent Literature 4: WO 2016/133206
Patent Literature 5: WO 2016/204142
Patent Literature 6: WO 2016/204217

SUMMARY OF INVENTION

Technical Problem

The disclosure aims to provide a composition that enables excellent dispersibility of an inorganic filler and has excellent oxidation resistance.

Solution to Problem

The disclosure relates to a composition containing an inorganic filler, a copolymer of a fluoromonomer and an amide bond-containing polymerizable vinyl compound, and a solvent.

Preferably, the composition has a mass ratio (inorganic filler/copolymer) of the inorganic filler to the copolymer of 0.1 to 100.

Preferably, the copolymer is a copolymer of at least one fluoromonomer selected from the group consisting of tetrafluoroethylene and hexafluoropropylene and the amide bond-containing polymerizable vinyl compound, and the copolymer contains a unit of the fluoromonomer and a unit of the amide bond-containing polymerizable vinyl compound in amounts of 65 to 7 mol % and 35 to 93 mol %, respectively, of all monomer units.

Preferably, the inorganic filler includes a carbon filler.

Preferably, the inorganic filler includes fibrous carbon.

Preferably, the inorganic filler includes carbon nanotube.

The disclosure also relates to a laminate including a substrate and a film that is on the substrate and is obtainable from the composition.

The disclosure also relates to a conductive member including the laminate.

The disclosure also relates to a dispersant for dispersing an inorganic filler in a solvent, the dispersant containing a copolymer of a fluoromonomer and an amide bond-containing polymerizable vinyl compound.

Advantageous Effects of Invention

The disclosure can provide a composition that enables excellent dispersibility of an inorganic filler and has excellent oxidation resistance.

DESCRIPTION OF EMBODIMENTS

The following describes the disclosure in detail. The disclosure relates to a composition containing an inorganic filler; a copolymer of a fluoromonomer and an amide bond-containing polymerizable vinyl compound; and a solvent.

Since the composition of the disclosure contains the copolymer, the composition has excellent dispersibility of the inorganic filler (dispersibility of the inorganic filler in a solvent) and excellent oxidation resistance compared to the case of using polyvinylpyrrolidone (PVP), for example.

Also, the composition of the disclosure has excellent dispersibility of the inorganic filler and excellent oxidation resistance even when the copolymer is in a relatively small amount.

Also, the composition of the disclosure has excellent dispersibility of the inorganic filler even after a long period of time (e.g., after 7 days or more after preparation).

The composition of the disclosure shows little change in viscosity.

Examples of the inorganic filler include a carbon filler, a ceramic filler, and a metal filler.

Examples of the carbon filler include carbon black (e.g., Ketjen black, acetylene black, furnace black, and channel black), fibrous carbon (e.g., carbon fiber, carbon nanotube, carbon nanofiber, carbon nanohorn, and carbon nanobrush), sheet-shaped carbon (e.g., graphene), spherical carbon (e.g., fullerene), nanoporous carbon, and graphite (natural graphite, artificial graphite).

Preferred among these is fibrous carbon, and more preferred is carbon nanotube (CNT).

The carbon black preferably has an average particle size of 0.1 nm to 100 μm, more preferably 1 nm to 50 μm.

The average particle size may be determined with a particle size distribution analyzer or an electron microscope (SEM).

The fibrous carbon preferably has an average fiber diameter of 0.1 nm to 500 nm, more preferably 1 to 200 nm.

The fibrous carbon preferably has an average fiber length/average fiber diameter ratio of 1 to 5000, more preferably 1 to 500.

The average fiber diameter and the average fiber length may be determined with a particle size distribution analyzer or an electron microscope (SEM).

The sheet-shaped carbon may have a single-layer structure or a multi-layer structure including multiple sheets stacked. The multi-layer structure preferably includes 50 layers or less, more preferably 10 layers or less.

The number of stacked layers may be determined by Raman spectroscopy.

15 The sheet-shaped carbon preferably has an average layer thickness of 0.1 to 1 nm, more preferably 0.2 to 0.4 nm.

The longest portions of the sheet-shaped carbons when spread out preferably have an average length of 0.1 nm to 1,000 μm, more preferably 1 nm to 100 μm.

The average length may be determined with an electron microscope (SEM).

The spherical carbon preferably has an average 25 particle size of 0.1 nm to 100 μm, more preferably 0.1 nm to 1 μm.

The average particle size may be determined with a particle size distribution analyzer or an electron microscope (SEM).

Examples of the ceramic filler include particles of inorganic nitride, carbide, boride, or oxide of zirconium, tantalum, titanium, tungsten, silicon, aluminum, or beryllium. Specific examples thereof include particles of alumina, zirconia, aluminum nitride, beryllia, zirconium nitride, zirconium boride, titanium nitride, titanium oxide, silicon oxide, tantalum carbide, tungsten carbide, zirconium carbide, titanium carbide, silicon carbide, aluminum boride, and titanium boride.

Preferred among these are alumina, titanium oxide, and silicon oxide.

The ceramic filler preferably has an average particle size of 0.01 nm to 100 μm, more preferably 0.1 nm to 10 μm. The average particle size may be determined with a particle size distribution analyzer or an electron microscope (SEM).

Examples of the metal filler include particles of metal such as gold, silver, copper, nickel, palladium, tin, or aluminum.

Preferred among these are gold, silver, and copper.

The metal filler preferably has an average particle size of 0.01 nm to 100 μm, more preferably 0.1 nm to 1 μm. The average particle size may be determined with a particle size distribution analyzer or an electron microscope (SEM).

The inorganic filler is preferably a conductive inorganic filler, more preferably a carbon filler or a metal filler, still more preferably a carbon filler.

The copolymer is a copolymer containing a fluoromonomer unit and an amide bond-containing polymerizable vinyl compound unit. Herein, the copolymer may also be referred to as a fluoromonomer/amide bond-containing polymerizable vinyl compound copolymer.

In the composition of the disclosure, the copolymer may serve as a dispersant to disperse the inorganic filler in the solvent.

In order to further improve the dispersibility and oxidation resistance, the fluoromonomer/amide bond-containing polymerizable vinyl compound copolymer preferably contains the fluoromonomer unit and the amide bond-containing polymerizable vinyl compound unit in amounts of 99.9 to 0.1 mol % and 0.1 to 99.9 mol %, respectively, of all monomer units. More preferably, the fluoromonomer unit and the amide bond-containing polymerizable vinyl compound unit are present in amounts of 65 to 7 mol % and 35 to 93 mol %, respectively. Still more preferably, the fluoromonomer unit and the amide bond-containing polymerizable vinyl compound unit are present in amounts of 55 to 15 mol % and 45 to 85 mol %, respectively. Particularly preferably, the fluoromonomer unit and the amide bond-containing polymerizable vinyl compound unit are present in amounts of 45 to 20 mol % and 55 to 80 mol %, respectively.

More than 99.9 mol % of the amide bond-containing polymerizable vinyl compound unit may cause poor oxidation resistance. Less than 0.1 mol % of the amide bond-containing polymerizable vinyl compound unit may cause reduced surface active performance and poor dispersibility.

The copolymer preferably has a mole ratio of the fluoromonomer unit to the amide bond-containing polymerizable vinyl compound unit (fluoromonomer unit/amide bond-containing polymerizable vinyl compound unit) of 0.07 to 1.50, more preferably 0.25 to 1.25, still more preferably 0.25 to 0.82. Too low a mole ratio may cause poor oxidation resistance. Too high a mole ratio may cause poor dispersibility.

Examples of the fluoromonomer include (1) an olefin containing a fluorine atom attached to an $sp^2$-hybridized carbon atom, (2) a monomer represented by the formula: $CH_2{=}CX{-}COORf$ (wherein X is Cl, H, or an alkyl group, and Rf is a fluoroalkyl group), (3) a monomer represented by the formula: $CH_2{=}CH{-}Rf$ (wherein Rf is a fluoroalkyl group), and (4) a monomer represented by the formula: $CH_2{=}CH{-}ORf$ (wherein Rf is a fluoroalkyl group).

An example of the alkyl group is a C1-C3 alkyl group, and a methyl group is preferred.

The fluoroalkyl group is preferably a C1-C12 linear or branched fluoroalkyl group.

In order to introduce a fluorine atom into the copolymer and allow the fluorine atom to attach to a carbon atom of the polymer main chain and thereby to improve the oxidation resistance of the copolymer, the fluoromonomer is preferably the olefin (1). The fluoromonomer more preferably includes at least one selected from the group consisting of vinylidene fluoride, trifluoroethylene, tetrafluoroethylene, hexafluoropropylene, chlorotrifluoroethylene, monofluoroethylene, trifluorostyrene, and a fluoromonomer represented by the formula: $CH_2{=}CFRf1$ (wherein Rf1 is a C1-C12 linear or branched fluoroalkyl group), still more preferably at least one selected from the group consisting of vinylidene fluoride, trifluoroethylene, tetrafluoroethylene, hexafluoropropylene, chlorotrifluoroethylene, and trifluorostyrene.

The fluoromonomer preferably includes at least one selected from the group consisting of tetrafluoroethylene (TFE), hexafluoropropylene (HFP), chlorotrifluoroethylene (CTFE), vinylidene fluoride, trifluoroethylene, monofluoroethylene, fluoroalkyl vinyl ether, fluoroalkyl ethylene, trifluoropropylene, pentafluoropropylene, trifluorobutene, tetrafluoroisobutene, hexafluoroisobutene, trifluorostyrene, and a fluoromonomer represented by the formula: $CH_2{=}CFRf1$ (wherein Rf1 is a C1-C12 linear or branched fluoroalkyl group), more preferably at least one selected from the group consisting of TFE, CTFE, vinylidene fluoride, and HFP, still more preferably at least one selected from the group consisting of TFE and vinylidene fluoride.

In order to further improve the dispersibility and oxidation resistance, the fluoromonomer preferably includes at least one selected from the group consisting of ethylene fluoride (generated by replacing one or more hydrogen atoms of ethylene with fluorine atoms) and propylene fluoride (generated by replacing one or more hydrogen atoms of propylene with fluorine atoms), more preferably at least one selected from the group consisting of tetrafluoroethylene (TFE) and hexafluoropropylene (HFP).

The polymerizable vinyl compound contains not only an amide bond but also a polymerizable vinyl group.

The amide bond is a bond between a carbonyl group and a nitrogen atom.

Examples of the polymerizable vinyl group include vinyl, allyl, vinyl ether, vinyl ester, and acrylic groups.

Examples of the amide bond-containing polymerizable vinyl compound include N-vinyl lactam compounds such as N-vinyl-β-propiolactam, N-vinyl-2-pyrrolidone, N-vinyl-γ-valerolactam, N-vinyl-2-piperidone, and N-vinyl-heptolactam; acyclic N-vinylamide compounds such as N-vinyl formamide and N-methyl-N-vinyl acetamide; acyclic N-allyl amide compounds such as N-allyl-N-methyl formamide and allyl urea; N-allyl lactam compounds such as 1-(2-propenyl)-2-pyrrolidone; and acrylamide compounds such as (meth)acrylamide, N, N-dimethylacrylamide, and N-isopropylacrylamide.

Examples of the amide bond-containing polymerizable vinyl compound also include a compound represented by the following formula:

[Chem. 1]

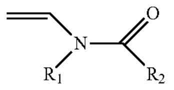

(wherein $R_1$ and $R_2$ are each independently H or a C1-C10 alkyl group) and a compound represented by the following formula:

[Chem. 2]

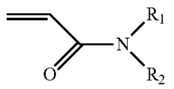

(wherein $R_1$ and $R_2$ are each independently H or a C1-C10 alkyl group).

Preferred among these are N-vinyl lactam compounds and acyclic N-vinylamide compounds, more preferred is at least one selected from the group consisting of N-vinyl-β-propiolactam, N-vinyl-2-pyrrolidone, N-vinyl-Y-valerolactam, N-vinyl-2-piperidone, and N-vinyl-heptolactam, still more preferred is at least one selected from the group consisting of N-vinyl-2-pyrrolidone and N-vinyl-2-piperidone, and particularly preferred is N-vinyl-2-pyrrolidone.

The fluoromonomer/amide bond-containing polymerizable vinyl compound copolymer may further contain a different monomer unit other than the fluoromonomer unit and the amide bond-containing polymerizable vinyl compound unit to the extent that the effects of the composition of the disclosure are not impaired. Examples of the different monomer unit include a vinyl ester monomer unit, a vinyl ether monomer unit, a (meth)acrylic monomer unit containing polyethylene glycol in a side chain, a vinyl monomer unit containing polyethylene glycol in a side chain, a (meth) acrylic monomer unit containing a long-chain hydrocarbon group, and a vinyl monomer unit containing a long-chain hydrocarbon group. The total amount of the different monomer units may be 0 to 50 mol %, may be 0 to 40 mol %, may be 0 to 30 mol %, may be 0 to 15 mol %, or may be 0 to 5 mol %.

The fluoromonomer/amide bond-containing polymerizable vinyl compound copolymer preferably substantially consists of a fluoromonomer unit and an amide bond-containing polymerizable vinyl compound unit.

The fluoromonomer/amide bond-containing polymerizable vinyl compound copolymer preferably has a weight average molecular weight of 10000 or more, more preferably 15000 or more, still more preferably 20000 or more, particularly preferably 30000 or more. The weight average molecular weight is more preferably 15000 to 500000, still more preferably 20000 to 300000, particularly preferably 30000 to 300000. The weight average molecular weight can be determined by gel permeation chromatography (GPC).

The composition of the disclosure preferably has a mass ratio of the inorganic filler to the copolymer (inorganic filler/copolymer) of 0.1 to 100. The mass ratio is more preferably 0.2 or higher, still more preferably 0.4 or higher, while more preferably 50 or lower, still more preferably 10 or lower, particularly preferably 5 or lower.

The composition of the disclosure, even when containing a relatively small amount of the copolymer (i.e., even when the mass ratio is relatively high), has excellent dispersibility and excellent oxidation resistance.

The composition of the disclosure further contains a solvent. Examples of the solvent include water and an organic solvent. Preferred is an organic solvent.

Examples of the organic solvent include nitrogen-containing organic solvents such as N-methyl-2-pyrrolidone, N, N-dimethylacetamide, and dimethylformamide; ketone solvents such as acetone, methyl ethyl ketone, cyclohexanone, and methyl isobutyl ketone; ester solvents such as ethyl acetate and butyl acetate; ether solvents such as tetrahydrofuran, dioxane, ethyl cellosolve, methyl cellosolve, diglyme, and triglyme; aromatic hydrocarbon solvents such as xylene, toluene, and solvent naphtha; aliphatic hydrocarbon solvents such as n-pentane, n-hexane, n-heptane, n-octane, n-nonane, n-decane, n-undecane, n-dodecane, and mineral spirits; and solvent mixtures of these.

The amount of the solvent is preferably 100000 to 10000000 parts by mass, more preferably 500000 to 5000000 parts by mass relative to 100 parts by mass of the inorganic filler.

The composition of the disclosure is preferably a dispersion where the inorganic filler is dispersed in the solvent. Since the composition of the disclosure contains the copolymer, the inorganic filler is dispersed in the solvent very well.

The composition of the disclosure may be a coating composition.

The composition of the disclosure may further contain a different component according to the use, for example. Examples of the different component include a fluoropolymer (excluding the fluoromonomer/amide bond-containing polymerizable vinyl compound copolymer), a non-fluoropolymer, an organic filler, an electrode material such as an electrode active material, and an ink pigment.

The fluoropolymer may be a polymer of a fluorine-containing ethylenic monomer and may be a copolymer obtainable by polymerizing a fluorine-containing ethylenic monomer and a fluorine-free ethylenic monomer. One or two or more fluorine-containing ethylenic monomers may be used and one or two or more fluorine-free ethylenic monomers may be used.

Examples of the fluorine-containing ethylenic monomer include tetrafluoroethylene, vinylidene fluoride, trichlorofluoroethylene, chlorotrifluoroethylene, vinyl fluoride, hexafluoropropylene, 2,3,3,3-tetrafluoropropene (1234yf), a fluoroolefin represented by the following formula (i):

$$CX^1_2=CX^2(CF_2)_nX^3 \quad \text{(i)}$$

(wherein $X^1$, $X^2$, and $X^3$ are the same as or different from each other, and are each a hydrogen atom or a fluorine atom, and n is an integer of 1 to 10), and a perfluoro (alkyl vinyl ether) represented by the following formula (ii):

$$CF_2=CF-ORf^2 \quad \text{(ii)}$$

(wherein Rf2 is a C1-C5 perfluoroalkyl group).

Examples of the fluorine-free ethylenic monomer include ethylene, propylene, 1-butene, 2-butene, vinyl chloride, a monomer (iii) represented by the following formula (iii):

[Chem. 3]

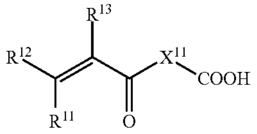

(iii)

wherein $R^{11}$ to $R^{13}$ are each independently a hydrogen atom, a chlorine atom, or a C1-C5 alkyl group, and $X^{11}$ is an atomic group that contains a main chain having 1 to 19 atoms and that has a molecular weight of not greater than 472.

The monomer (iii) is preferably a monomer (iii-1) represented by the following formula (iii-1):

[Chem. 4]

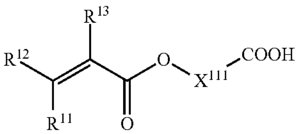

(iii-1)

wherein $R^{11}$ to $R^{13}$ are as described above, and $x^{111}$ is an atomic group that contains a main chain having 1 to 18 atoms and that has a molecular weight of not greater than 456.

Preferred examples of the fluoropolymer include a vinylidene fluoride homopolymer, a copolymer containing vinylidene fluoride and tetrafluoroethylene, a copolymer containing vinylidene fluoride and the monomer (iii), a copolymer containing vinylidene fluoride, tetrafluoroethylene, and the monomer (iii), a copolymer containing vinylidene fluoride, tetrafluoroethylene, and hexafluoropropylene, a copolymer containing vinylidene fluoride, tetrafluoroethylene, hexafluoropropylene, and the monomer (iii), and a copolymer containing vinylidene fluoride, hexafluoropropylene, and the monomer (iii).

The composition of the disclosure is suitably used as a composition for forming electrodes of secondary batteries such as lithium-ion batteries.

Electrodes of secondary batteries contain a conductive agent. When the conductive agent has poor dispersibility, the conductive agent fails to impart conductivity throughout the electrodes, causing poor performance. When an increased amount of the conductive agent is used to solve this issue, the energy density may be reduced.

Even when the inorganic filler is a conductive agent (conductive inorganic filler such as carbon filler), the composition of the disclosure can have excellent dispersibility of the inorganic filler. Also, even a small amount of the copolymer can lead to excellent dispersibility. This can result in improved performance of secondary batteries.

PVP which has been commonly used as a dispersant in the battery field has low oxidation resistance and decomposes at a high voltage of 4.45 V or higher, which may cause gas generation or an increase in resistance. The composition of the disclosure has excellent oxidation resistance, and thus is applicable to high-voltage secondary batteries.

Also, the composition of the disclosure shows a small change in viscosity when in the form of an electrode mixture slurry compared to the case of using PVP as a dispersant.

The composition of the disclosure, when used as a composition for forming electrodes of secondary batteries, preferably contains the conductive inorganic filler, the copolymer, and the solvent. The composition may further contain other components such as an electrode active material, a binder, and a thickener. Examples of the binder include the above-described fluoropolymers (excluding the fluoromonomer/amide bond-containing polymerizable vinyl compound copolymer).

The composition of the disclosure can be particularly suitably used as a composition for forming positive electrodes of secondary batteries.

The disclosure also relates to a laminate including a substrate and a film that is on the substrate and is obtainable from the composition of the disclosure. The substrate may be formed from, for example, metal, ceramic, resin, or glass.

Examples of the metal include iron, stainless steel, copper, aluminum, nickel, and titanium. Examples of the ceramic include earthenware, porcelain, an alumina material, a zirconia material, and a silicon oxide material. Examples of the resin include polyethylene terephthalate resin, polycarbonate resin, silicone resin, fluorosilicone resin, polyamide resin, polyamide-imide resin, polyimide resin, polyester resin, epoxy resin, polyphenylene sulfide resin, phenol resin, acrylic resin, and polyethersulfone resin.

The substrate may be a secondary battery current collector. The current collector (positive electrode current collector or negative electrode current collector) may be metal foil or metal mesh of iron, stainless steel, copper, aluminum, nickel, or titanium, for example. In particular, for example, the positive electrode current collector is preferably aluminum foil and the negative electrode current collector is preferably copper foil.

The laminate of the disclosure may be produced by applying the composition of the disclosure to the substrate, optionally followed by any of steps such as drying, curing, and pressing.

A film obtainable from the composition may be directly formed on the substrate or may be formed on another layer located on the substrate.

The film obtainable from the composition may have a thickness of 1 to 1000 μm, for example, although it depends the use.

The laminate of the disclosure can suitably be used for a conductive member. In this case, the inorganic filler is preferably a conductive inorganic filler.

A conductive member including the laminate of the disclosure is also an aspect of the disclosure. The conductive member is preferably used as a secondary battery electrode, for example.

The disclosure also relates to a dispersant for dispersing an inorganic filler in a solvent, the dispersant containing a copolymer of a fluoromonomer and an amide bond-containing polymerizable vinyl compound.

The dispersant of the disclosure, which contains the copolymer, has better dispersibility of the inorganic filler (dispersibility of the inorganic filler in a solvent) and better oxidation resistance than dispersants containing polyvinylpyrrolidone (PVP), for example.

The dispersant of the disclosure, even in a relatively small amount, has an excellent ability to disperse the inorganic filler and excellent oxidation resistance.

The dispersant of the disclosure even after a long period of time (e.g., after 7 days or more after preparation) can provide a composition that enables excellent dispersibility of an inorganic filler (inorganic filler dispersion).

The dispersant of the disclosure can also provide a composition (inorganic filler dispersion) showing a small change in viscosity.

The copolymer in the dispersant of the disclosure may be a copolymer similar to the copolymer of a fluoromonomer and an amide bond-containing polymerizable vinyl compound in the composition of the disclosure. Preferred examples thereof are the same.

The dispersant of the disclosure may consist only of the copolymer.

Examples of the inorganic filler and the solvent as targets of the dispersant of the disclosure include the same inorganic fillers and solvents usable in the composition of the disclosure. Preferred examples thereof are the same.

The dispersant of the disclosure is preferably used such that the mass ratio of the inorganic filler to the copolymer (inorganic filler/copolymer) is 0.1 to 100. The mass ratio is more preferably 0.2 or higher, still more preferably 0.4 or higher, while more preferably 50 or lower, still more preferably 10 or lower, particularly preferably 5 or lower.

The dispersant of the disclosure, even when used in a relatively small amount (even when the mass ratio is relatively high), has an excellent ability to disperse an inorganic filler and excellent oxidation resistance.

The dispersant of the disclosure is preferably a dispersant for dispersing 100 parts by mass of the inorganic filler in 100000 to 10000000 parts by mass, more preferably 500000 to 5000000 parts by mass of the solvent.

The composition, laminate, and dispersant of the disclosure can be suitably used in various fields where the dispersibility of an inorganic filler and oxidation resistance are demanded.

For example, they can suitably be used for inks, rubbers, conductive films, and electrochemical devices (e.g., batteries). In particular, they are preferably used for secondary batteries, more preferably used for electrodes of secondary batteries.

EXAMPLES

The disclosure is described in more detail below with reference to examples. Still, the disclosure is not intended to be limited to these examples.

The following components were used in the examples and comparative examples.

- SWCNT: single wall CNT (CNTs2, SUSN)
- Alumina: alumina particles having an average particle size of 0.5 μm (commercial product)
- NMP: N-methyl-2-pyrrolidone (water-soluble organic solvent, Tokyo Chemical Industry Co., Ltd.)
- PVP K30: polyvinylpyrrolidone having a weight average molecular weight of $4.0\times10^4$ (Tokyo Chemical Industry Co., Ltd.)
- Dispersant 1: copolymer having a weight average molecular weight of $4.6\times10^4$, containing 48 mol % of a tetrafluoroethylene unit and 52 mol % of a N-vinyl-2-pyrrolidone unit
- Dispersant 2: copolymer having a weight average molecular weight of $4.5\times10^4$, containing 36 mol % of a tetrafluoroethylene unit and 64 mol % of a N-vinyl-2-pyrrolidone unit
- Additive 1: PVdF (polyvinylidene fluoride) (#7200, Kureha Corporation)

Preparation of Dispersion

Example 1

SWCNT (10 mg) and a dispersant 1 (100 mg) were added to NMP (100 g) and they were sonicated (37 kHz) for one hour. Thereby, a SWCNT dispersion 1 was prepared.

Example 2

A dispersion 2 was prepared as in Example 1, except that the amount of the dispersant 1 was changed from 100 mg to 50 mg.

Example 3

A dispersion 3 was prepared as in Example 1, except that the amount of the dispersant 1 was changed from 100 mg to 20 mg.

Example 4

A dispersion 4 was prepared as in Example 1, except that the amount of the dispersant 1 was changed from 100 mg to 10 mg.

Example 5

A dispersion 5 was prepared as in Example 3, except that the dispersant 2 (20 mg) was used instead of the dispersant 1.

Example 6

A dispersion 6 was prepared as in Example 3, except that alumina (10 mg) was used instead of the inorganic filler.

Example 7

A dispersion 7 was prepared as in Example 6, except that the dispersant 2 (20 mg) was used instead of the dispersant 1.

Example 8

A dispersion 8 was prepared as in Example 3, except that the additive 1 (100 mg) was added to the dispersion 3.

Example 9

A dispersion 9 was prepared as in Example 5, except that the additive 1 (100 mg) was added to the dispersion 5.

Comparative Example 1

SWCNT (10 mg) was added to NMP (100 g) and they were sonicated (37 kHz) for one hour. Thereby, a SWCNT dispersion 10 was prepared.

Comparative Example 2

SWCNT (10 mg) and PVP K30 (100 mg) were added to NMP (100 g) and they were sonicated (37 kHz) for one hour. Thereby, a SWCNT dispersion 11 was prepared.

Comparative Example 3

A dispersion 12 was prepared as in Comparative Example 2, except that the amount of PVP K30 was changed from 100 mg to 20 mg.

Comparative Example 4

A dispersion 13 was prepared as in Comparative Example 3, except that the additive 1 (100 mg) was added to the dispersion 12.

Evaluation of Dispersibility

The dispersions 1 to 13 were left to stand at room temperature for five hours, and about 2 mL of each sample was put into a 5-mL vial. Each sample was visually checked for precipitation. The dispersions were further left to stand for 7 days and checked for precipitation.

Dispersions with precipitation were evaluated as poor and dispersions with no precipitation were evaluated as good. The results are shown in Table 1.

Evaluation of Oxidation Resistance

The oxidation resistance was evaluated by linear sweep voltammetry (LSV). In the measurement by LSV, 1.0 M $LiPF_6$ was used as an electrolyte and a solution mixture containing ethylene carbonate and ethyl methyl carbonate in a volume ratio of 3:7 was used as a standard solvent for measurement. To a portion of the standard solvent for measurement was added 1.0% by weight of PVP K30, the dispersant 1, or the dispersant 2. Then, to each solution was added 0.1% by mass of SWCNT. Thereby, three solutions for measurement were prepared. Each solution for measurement prepared in advance was put into a measurement vessel, and a platinum electrode as a working electrode and lithium electrodes as a counter electrode and a reference electrode were immersed into the solution. Thereby, LSV measurement cells were prepared. Each cell was subjected to onset potential measurement where the voltage was swept from the open-circuit voltage (OCV) to 8 V (vs. Li/Li) for oxidation at a sweep rate of 5 mV/s. The onset potential was determined as the potential at which the response current reached 5 $mA/cm^2$.

The results are shown in Table 2.

TABLE 1

| Level | Inorganic filler Type | Inorganic filler Amount [mg] | Dispersion Disperison No. | Dispersion Type of dispersant | Dispersion Amount [mg] | Dispersion Type of solvent |
|---|---|---|---|---|---|---|
| Example 1 | SWCNT | 10 | Disperison 1 | Dispersant 1 | 100 | NMP |
| Example 2 | SWCNT | 10 | Disperison 2 | Dispersant 1 | 50 | NMP |
| Example 3 | SWCNT | 10 | Disperison 3 | Dispersant 1 | 20 | NMP |
| Example 4 | SWCNT | 10 | Disperison 4 | Dispersant 1 | 10 | NMP |
| Example 5 | SWCNT | 10 | Disperison 5 | Dispersant 2 | 20 | NMP |
| Example 6 | Alumina | 10 | Disperison 6 | Dispersant 1 | 20 | NMP |
| Example 7 | Alumina | 10 | Disperison 7 | Dispersant 2 | 20 | NMP |
| Example 8 | SWCNT | 10 | Disperison 8 | Dispersant 1 | 20 | NMP |
| Example 9 | SWCNT | 10 | Disperison 9 | Dispersant 2 | 20 | NMP |
| Comparative Example 1 | SWCNT | 10 | Disperison 10 | — | — | NMP |
| Comparative Example 2 | SWCNT | 10 | Disperison 11 | PVP K30 | 100 | NMP |
| Comparative Example 3 | SWCNT | 10 | Disperison 12 | PVP K30 | 20 | NMP |
| Comparative Example 4 | SWCNT | 10 | Disperison 13 | PVP K30 | 20 | NMP |

| Level | Dispersion Amount of solvent [g] | Filler/ dispersant ratio | Additive Type | Additive Amount [mg] | Evaluation results of dispersibility After preparation | Evaluation results of dispersibility After 7 days |
|---|---|---|---|---|---|---|
| Example 1 | 100 | 0.1 | — | — | Good | Good |
| Example 2 | 100 | 0.2 | — | — | Good | Good |
| Example 3 | 100 | 0.5 | — | — | Good | Good |
| Example 4 | 100 | 1.0 | — | — | Good | Poor |
| Example 5 | 100 | 0.5 | — | — | Good | Good |
| Example 6 | 100 | 0.5 | — | — | Good | Poor |
| Example 7 | 100 | 0.5 | — | — | Good | Poor |
| Example 8 | 100 | 0.5 | Additive 1 | 100 | Good | Good |
| Example 9 | 100 | 0.5 | Additive 1 | 100 | Good | Good |
| Comparative Example 1 | 100 | — | — | — | Poor | — |
| Comparative Example 2 | 100 | 0.1 | — | — | Good | Poor |
| Comparative Example 3 | 100 | 0.5 | — | — | Poor | — |
| Comparative Example 4 | 100 | 0.5 | Additive 1 | 100 | Good | Poor |

TABLE 2

| Dispersant | Results of LSV measurement [V vs Li/Li+] |
|---|---|
| Dispersant 1 | 6.75 |
| Dispersant 2 | 6.73 |
| PVP K30 | 6.70 |

The invention claimed is:

1. A composition comprising:

an inorganic filler;

a copolymer of at least one fluoromonomer and an amide bond-containing polymerizable vinyl compound;

a positive electrode active material for a lithium-ion battery; and a solvent, wherein the amide bond-containing polymerizable vinyl compound is at least one selected from the group consisting of N-vinyl lactam compounds, acyclic N-vinylamide compounds, acyclic N-allyl amide compounds, and N-allyl lactam compounds, and the copolymer contains units of the at least one fluoromonomer and units of the amide bond-containing polymerizable vinyl compound in amounts of 65 to 7 mol % and 35 to 93 mol %, respectively, of all monomer units of the copolymer.

2. The composition according to claim 1, wherein the composition has a mass ratio (inorganic filler/copolymer) of the inorganic filler to the copolymer of 0.1 to 100.

3. The composition according to claim 1, wherein the at least one fluoromonomer is selected from the group consisting of tetrafluoroethylene and hexafluoropropylene.

4. The composition according to claim 1, wherein the inorganic filler includes a carbon filler.

5. The composition according to claim 1, wherein the inorganic filler includes fibrous carbon.

6. The composition according to claim 1, wherein the inorganic filler includes a carbon nanotube.

7. The composition according to claim 1, wherein the composition further comprises a fluoropolymer, excluding the fluoromonomer/amide bond-containing polymerizable vinyl compound copolymer, which is at least one selected from the group consisting of a vinylidene fluoride homopolymer, a copolymer containing vinylidene fluoride and tetrafluoroethylene, a copolymer containing vinylidene fluoride and a monomer (iii) represented by the following formula (iii), a copolymer containing vinylidene fluoride, tetrafluoroethylene, and the monomer (iii), a copolymer containing vinylidene fluoride, tetrafluoroethylene, and hexafluoropropylene, a copolymer containing vinylidene fluoride, tetrafluoroethylene, hexafluoropropylene, and the monomer (iii), and a copolymer containing vinylidene fluoride, hexafluoropropylene, and the monomer (iii), wherein the formula (iii) is

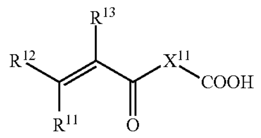

(iii)

wherein $R^{11}$ to $R^{13}$ are each independently a hydrogen atom, a chlorine atom, or a C1-C5 alkyl group, and $X^{11}$ is an atomic group that contains a main chain having 1 to 19 atoms and that has a molecular weight of not greater than 472.

8. A laminate comprising:

a substrate; and a film that is on the substrate and is obtained from the composition according to claim 1.

9. A conductive member comprising the laminate according to claim 8.

* * * * *